United States Patent Office 3,526,641
Patented Sept. 1, 1970

3,526,641
PROCESS FOR THE PRODUCTION
OF METADIOXANES
Bengt O. Wesslen, Lindome, and Lars-Olof Ryrfors, Perstorp, Sweden, assignors to Perstorp AB, Perstorp, Sweden
No Drawing. Filed Apr. 13, 1967, Ser. No. 630,513
Claims priority, application Sweden, Apr. 27, 1966, 5,680/66
Int. Cl. C07d 15/02
U.S. Cl. 260—340.7     5 Claims

ABSTRACT OF THE DISCLOSURE

The production of metadioxanes by reacting ketones and aldehydes having an activated methylene group with formaldehyde or oligomers of formaldehyde in the presence of a catalyst. Acid catalysts are used and preferably Lewis acid catalysts.

---

The present invention relates to a process for the production of substituted metadioxanes or 1,3-dioxanes.

Metadioxanes constitute important starting substances for the production of conjugated diolefines. It has been known before to produce metadioxanes at a rather elevated temperature in the presence of catalysts by condensing formaldehyde with monoolefines containing at least 3 carbon atoms per molecule (German Pat. 1,142,591). For instance 4-methylmetadioxane is produced by condensing formaldehyde with propylene while 4,4-dimethyl-metadioxane is produced by condensing isobutene and formaldehyde. Metadioxanes can also be produced by distilling dihydroxymethylketones in the presence of iodine (Morgan, Griffith, J. Chem. Soc. 1937, 841).

According to the present invention metadioxanes are produced by reacting ketones or aldehydes having an activated methylene group and formaldehyde or oligomers of formaldehyde for instance trioxane in the presence of catalysts.

The catalysts which are used are acid catalysts or so-called Lewis-acids, for instance sulphuric acid, aluminium chloride, borontrifluoride or complex substances of borontrifluoride such as borontrifluorideetherate and cation exchanger.

The reaction is preferably carried out in a solvent, but if the states of aggregate of the starting substances are suitable, the solvent can be avoided. A requirement on the solvent is that it should be inert. Chloroform gives a good result. Other useful solvents which can be mentioned are benzene, chlorobenzene, nitromethane, chlorinated hydrocarbons, 1,2-dichloroethane, tetrachloromethane and cyclohexane.

The aldehydes or ketones that can be used in the reaction are represented by the formula:

R—CH$_2$—C—R$_1$
‖
O where R$_1$ can be hydrogen (aldehyde), alkyl, aryl, heterocyclic radicals and R can be hydrogen, alkyl, aryl, acyl, carboxyalkyl and heterocyclic residue.

Metadioxanes are heterocyclic compounds having oxygen atoms in the 1- and 3-position. The metadioxanes that can be produced according to the embodiment examples in the present invention are substituted in 5-position and can be summarized in the following structure formula:

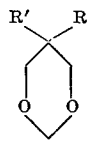

The R-radicals can be aliphatic or aromatic. If the ketone in the starting substances is methyl-ethylketone, R$_1$=CH$_3$CO and R=CH$_3$ (5-acetyl-5-methyl-1,3-dioxane), while methyl-n-propylketone gives R=CH$_2$CH$_3$ and R$_1$=CH$_3$CO (5-acetyl-5-ethyl-1,3-dioxane). Methyl-n-butylketone gives R=CH$_2$CH$_2$CH$_3$ and R$_1$=acetyl (5-acetyl - 5 - n - propyl-1,3-dioxane). Diethylketone gives R$_1$=COCH$_2$CH$_3$ and R=CH$_3$ (5-methyl-5-propionyl-1,3-dioxane). Cyclopentanone gives a ring-formed substitution with the formula:

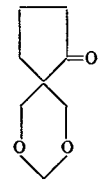

(1,3-dioxane-5-para-2'-cyclopentanone).

Aromatic ketones for instance propiophenone, benzylmethylketone and desoxybenzoin

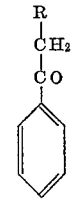 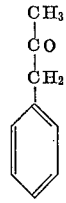

R=CH$_3$: propiophenone   Benzylmethylketone
R=C$_6$H$_5$: desoxybenzoin
(benzyl-phenylketone).

Propiophenone gives 5-benzyl-5-methyl-1,3-dioxane.

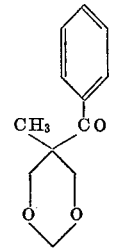

Benzylmethylketone gives 5-acetyl - 5 - phenyl-1,3-dioxane.

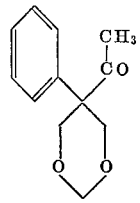

Desoxybenzoin or benzylphenylketone gives 5-benzoyl-5-phenyl-1,3-dioxane.

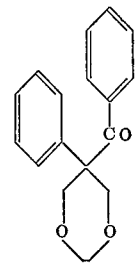

Among the aldehydes butyraldehyde $CH_3CH_2CH_2CHO$ can be mentioned which gives 5-ethyl-5-formyl-1,3-dioxane.

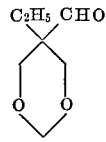

and propionaldehyde $CH_3CH_2CHO$ which gives 5-methyl-5-formyl-1,3-dioxane. Certain β-dicarbonyl compounds can also be used. Acetylacetone

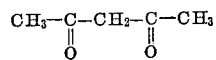

for instance gives 5,5-diacetyl-1,3-dioxane, while ethylacetoacetate gives 5-acetyl-5-carboxyethyl-1,3-dioxane.

The desired compounds are manufactured by mixing the starting materials and adding the cataylst, whereupon suitable heating is applied in case that the reaction does not start spontaneously. It is suitable to carry out the reaction under reflux with water separation for a few hours.

The ratio between ketone or aldehyde and formaldehyd (trioxane) can vary. However, a surplus of ketone or aldehyde in proportion to trioxane gives a more rapid reaction especially when methylethylketone is induced to react with trioxane. If for instance 0.33 mol trioxane per mol methylethylketone and 10 mol percent borontrifluorideetherate (counted upon the amount of ketone) are reacting, already after 90 minutes 5-acetyl-5-methyl-1,3-dioxane is obtained in a yield of 70% of the theoretical one calculated upon the trioxane. Similar reactions are obtained if sulphuric acid is used as a catalyst.

Instead of trioxane formaldehyde can be used. As a principle the reaction is the same and only differs in practical respects from trioxane or paraformaldehyde as a source of formaldehyde.

The amount of catalyst that should be present is not critical and can vary within wide limits. However, there is an optimal concentration for each reaction. For instance by the production of 5-acetyl-5-methyl-1,3-dioxane using aluminum chloride as a catalyst it is optimal that the concentration of the catalyst is 40–50 mol percent of $AlCl_3$ per mol ketone. If an optimal concentration of catalyst is not used, however, still a satisfactory yield can be obtained by using a longer reaction time.

The invention is described more in detail in the following embodiment examples, which show reactions between ketones containing an activated methylene group and formaldehyde or formaldehyde oligomers.

EXAMPLE 1

Production of 5-methyl-5-acetyl-1,3-dioxane 36 g. methylethylketone (0.5 mol) and 130 g. trioxane (4.4 mols $CH_2O$) were dissolved in 350 ml. $CHCl_3$. 70 g. $AlCl_3$ (0.5 mol) was added during 30 min. together with further 100 ml. $CHCl_3$. Then the temperature rose very much. Afterwards the reaction mixture was reflux boiled during 2 hours, whereupon ice and 50 ml. concentrated HCl were added. The mixture was shaken with $CHCl_3$ and the extract was washed with $H_2O$ and a solution of $NaHCO_3$. After drying with sikkon and vacuum evaporation 93 g. yellow oil was obtained which smelt strongly of formaldehyde. The oil was found to consist mainly of 5-methyl-5-acetyl-1,3-dioxane. The yield was 50% of the theoretical one.

EXAMPLE 2

Production of 5-methyl-5-acetyl-1,3-dioxane 18 g. methylethylketone (0.25 mol) and 30 g. trioxane (0.33 mol) dissolved in 50–70 ml. $CHCl_3$ were reacted during 2 hours under the influence of 5, 10, 33, 42, 50, 57 and 67 mol percent $AlCl_3$ respectively (based upon the ketone). The reaction mixtures were shaken with 4× 30 ml. $H_2O$. The $H_2O$-extracts were extracted with 30 ml. $CHCl_3$ that was joined with the other phase of $CHCl_3$. Then this one was shaken with 30 ml. $NaHCO_3$-solution which in its turn was extracted with 30 ml. $CHCl_3$. The solutions of $CHCl_2$ were joined and dried. The yield amounted to 8, 7, 17, 1, 47, 50, 55, 37 and 46% respectively of the theoretical one. At prolongation of the reaction time the yield rose very much.

EXAMPLE 3

Production of 5-methyl-5-acetyl-1,3-dioxane 18.5 g. of methylethylketone (0.25 mol) and 30 g. trioxane (0.33 mol) were dissolved in 125 ml. $CHCl_3$ and heated to reflux boiling. The apparatus was provided with a water-trap. Thereafter $BF_3$-etherate, 3.5 g. (0.025 mol; 10 mol percent) was added. After 4 hours the yield was 72%.

EXAMPLE 4

Production of 5-methyl-5-acetyl-1,3-dioxane 36 g. methylethylketone (0.5 mol) and 15 g. trioxane (0.167 mol) were dissolved in 75 ml. $CHCl_3$ and reflux boiled under water-trap. 7.0 g. $BF_3$-etherate (0.05 mol) was added. Already after 90 min. the yield was 73%.

EXAMPLE 5

Production of 5-methyl-5-acetyl-1,3-dioxane 36 g. of methylethylketone (0.5 mol) and 15 g. trioxane (0.167 mol) were dissolved in 100 ml. $CHCl_3$ and reflux boiled under water-trap. 1 ml. concentrated $H_2SO_4$ (0.018 mol) was added. After 60 min. the yield was 77%.

EXAMPLE 6

Production of 5-methyl-5-acetyl-1,3-dioxane 36 g. methylethylketone (0.5 mol) and 100 ml. $CHCl_3$ were heated to reflux boiling under water-trap. 7 g. $BF_3$-etherate (0.05 mol) was added and 11.5 gaseous formaldehyde (0.384 mol) was supplied during 40 min. The reaction mixture was stirred effectively. After 60 min. the yield was about 50%.

EXAMPLE 7

Production of 5-methyl-5-acetyl-1,3-dioxane 34.1 g. methyl-n-propylketone (0.4 mol) and 48 g. trioxane (1.6-mols $CH_2O$) were dissolved in 65 ml. $CHCl_3$. 18 g. $AlCl_3$ (0.135 mol) was added during 3 min. Then the solution started reflux boiling. Thereafter the mixture was reflux boiled during 50 min. further. The mixture was transferred to a parting funnel, 100 ml. $CHCl_3$ was added and the mixture was shaken with diluted HCl, $H_2O$ and $NaHCO_3$-solution. The solution was dried over sikkon and vacuum evaporated. After vacuum distillation a yield of 21% of the theoretical one was obtained, calculated upon methyl-n-propylketone.

EXAMPLE 8

Production of 5-acetyl-5-n-propyl-1,3-dioxane 50.0 g. methyl-n-butylketone (0.5 mol) and 60.0 g. trioxane (0.67 mol) were dissolved in 65 ml. $CHCl_3$ and 22.5 g. $AlCl_3$ (0.167 mol) was supplied during about 5 minutes. The reaction mixture was stirred effectively. The temperature rose and after a few minutes the mixture congealed to a gel After a few minutes more the mixture became more highly liquid and was heated to reflux boiling. The reaction time was 2 hours. The reaction mixture was transferred to a parting funnel, diluted with 100 ml. $CHCl_3$ and shaken with diluted HCl, $H_2O$ and finally with $NaHCO_3$-solution. The $CHCl_3$-solution was dried over sikkon and evaporated in vacuum. After vacuum distillation a yield of 29% of the theoretical one was obtained.

EXAMPLE 9

Production of 5-methyl-5-propionyl-1,3-dioxane 50 g. diethylketone (0.58 mol) and 45 g. trioxane (0.5 mol) were dissolved in 100 ml. CHCl₃, whereupon 7.1 g. BF₃-etherate (0.05 mol) was supplied. The solution was refluxed boiled under water-trap during 135 min. A certain precipitation of paraform could be seen at the start of the reaction, but this was dissolved after a while. The reaction mixture was refrigerated, 50 ml. CHCl₃ was added and the solution was shaken with 3× 50 ml. NaHCO₃-solution. The solution was dried over Na₂SO₄ and evaporatod and the rest was distilled. Then a yield of 49% of the theoretical one was obtained, calculated upon the trioxane.

EXAMPLE 10

Production of 5-benzoyl-5-methyl-1,3-dioxane 33.5 g. propiophenone (0.25 mol) and 15 g. trioxane (0.167 mol) were dissolved in 40 ml CHCl₃ and 1 ml. concentrated H₂SO₄ (0.018 mol) was added. The mixture was reflux boiled under water-trap during 2.5 hours. The reaction mixture was shaken with 2× 40 ml. H₂O and neutralized with solid NaHCO₃ and a few ml. H₂O. After drying over Na₂SO₄ the solution was evaporated in vacuum. Then 37.8 g. of a substantially crystalline product was obtained. The crystals were isolated. The total yield was 84% of the theoretical one The experiment was repeated with 0.10 mol AlCl₃ instead of H₂SO₄. The same result was obtained.

EXAMPLE 11

Production of 5-acetyl-5-phenyl-1,3-dioxane 20 g. benzylmethylketone (0.15 mol) and 14.5 g. trioxane (0.165 mol) were dissolved in 40 ml CHCl₃. 2.2 g. BF₃-etherate (0.015 mol) was added whereupon the solution was reflux boiled during 100 min. The reaction mixture was shaken with 50 ml. H₂O and with 2× 40 ml. NaHCO₃-solution. After drying the solution was evaporated and the rest was distilled in vcauum. Then the yield was 54% of the theoretical one.

EXAMPLE 12

Production of 5-benzoyl-5-1,3-dioxane 29.4 g. desoxybenzoin (0.15 mol) and 14.5 g. trioxane (0.165 mol) were dissolved in 50 ml. CHCl₃ and 2.2 g. BF₃-etherate (0.015 mol) was added. The solution was reflux boiled under water-trap during 2 hours. The reaction was carried out in N₂-atmosphere. The reaction mixture was shaken with 2× 100 ml. NaHCO₃-solution, dried over Na₂SO₄ and evaporated in vacuum. The yield amounted to 72% of the theoretical one.

EXAMPLE 13

Production of 5-acetyl-5-carboxyethyl-1,3-dioxane 65 g. ethylacetoacetate (0.5 mol) and 45 g. trioxane (0.5 mol) were dissolved in 75 ml. CHCl₃ and reflux boiled under water-trap. 2 ml. concentrated H₂SO₄ (0.036 mol) was supplied, whereupon a violet reaction started. Thereafter the reaction mixture was reflux boiled during 7.5 hours and then it stood over night at room temperature. Afterwards the reaction mixture was shaken with H₂O and neutralized with solid NaHCO₃ and a few ml. H₂O. After drying over Na₂SO₄ the reaction solution was evaporated in vacuum and the rest was distilled in vacuum. One fraction contained 11.7 g. of a colourless oil which was identified as 5-acetyl-5-carboxyethyl-1,3-dioxane. The yield was 12% of the theoretical one.

EXAMPLE 14

Production of 5-ethyl-5-formyl-1,3-dioxane 58 g. butyraldehyde (0.8 mol) and 72 g. trioxane (0.8 mol) were dissolved in 300 ml. CHCl₃, whereupon 11.35 g. BF₃-etherate (0.08 mol) was supplied. Then the solution was reflux boiled under water-trap during 24 hours. Thereafter the solution was shaken with a Na₂CO₃-solution and evaporated in vacuum. The remaining yellow oil contained about 57 g. of 5-ethyl-5-formyl-1,3-dioxane. The yield was 50% of the theoretical one.

EXAMPLE 15

Production of 5-ethyl-5-formyl-1,3-dioxane 58 g. butyraldehyde (0.8 mol) and 72 g. paraform (0.8 mol) were suspended in 300 ml. CHCl₃, whereupon 11.35 g. BF₃-etherate (0.08 mol) was added. Then the solution was reflux boiled under water-trap during 24 hours. Thereafter the solution was shaken with a NaCO₃-solution and evaporated in vacuum. The obtained yellow oil was distilled in vacuum and 41 g. of 5-ethyl-5-formyl-1,3-dioxane was obtained. The yield was about 35% of the theoretical one counted upon formaldehyde.

EXAMPLE 16

Production of 5-methyl-5-formyl-1,3-dioxane 58 g. propionaldehyde (1 mol) and 90 g. trioxane (1 mol) were dissolved in 400 ml. CHCl₃, whereupon BF₃-etherate was added. Then the solution was reflux boiled under water-trap during 30 hours. The solution was neutralized with a Na₂CO₃-solution and evaporated in vacuum. After distillation in vacuum 5-methyl-5-formyl-1,3-dioxane was obtained in a yield of 20%.

We claim:
1. A process for the production of a metadioxane having the formula

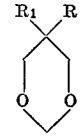

wherein $R_1$ and R are CH₃CO and CH₃, CH₃CO and C₂H₅, CH₃CO and C₃H₇, CH₃CO and C₆H₅, CH₃CO and CH₃CO, CH₃CO and C₂H₅COO, C₂H₅CO and CH₃, C₆H₅CO and CH₃, C₆H₅CO and C₆H₅, CHO and C₂H₅, CHO and CH₃, respectively comprising directly reacting formaldehyde or an oligomer of formaldehyde in the presence of a Lewis acid catalyst with a compound selected from the group consisting of methyl ethyl ketone, methyl n-propyl ketone, methyl n-butyl ketone, benzyl methyl ketone, acetyl acetone, ethyl acetoacetate, diethyl ketone, propiophenone, desoxy benzoin, butyraldehyde and propionaldehyde.

2. A process according to claim 1, wherein the Lewis acid catalyst is aluminum chloride, borontrifluoride, borontrifluoride etherate or sulfuric acid.

3. A process according to claim 1, wherein the reaction is carried out in chloroform as a solvent.

4. A process according to claim 1, wherein the ketone or aldehyde is reacted with trioxane in an amount of 3.0–0.75 mole per mole of trioxane.

5. A process for production of 1,3-dioxane-5-para-2′-cyclopentanone haivng the formula

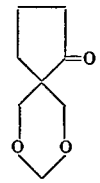

comprising directly reacting formaldehyde or an oligomer of formaldehyde in the presence of a Lewis acid catalyst with cyclopentanone.

References Cited

Engelhardt et al.: "Brennstoff-Chemie," No. 6, Bd. 4 (1963), pp. 178–183. TP 315.B836.

ALEX MAZEL, Primary Examiner

J. H. TURNIPSEED, Assistant Examiner

PO-1050
(5/69)

UNITED STATES PATENT OFFICE
CERTIFICATE OF CORRECTION

Patent No. 3,526,641      Dated September 1, 1970

Inventor(s) Bengt O. WESSLEN et al

It is certified that error appears in the above-identified patent and that said Letters Patent are hereby corrected as shown below:

Column 2, line 33, the words "give aromatic substitution products" are missing and should be inserted.

Column 4, line 4, "$CHCl_2$" should be "$CHCl_3$".

Column 4, line 37, After "11,5" insert -- g -- .

Column 4, line 42, In the heating of Example 7, delete "5-methyl-5-acetyl-1,3-dioxane" and insert -- 5-ethyl-5-acetyl-1,3-dioxane --

Column 6, line 10, delete "$NaCO_3$-solution" and insert -- $Na_2CO_3$-solution -- .

SIGNED AND
SEALED
NOV 10 1970

(SEAL)
Attest:

Edward M. Fletcher, Jr.
Attesting Officer

WILLIAM E. SCHUYLER, JR.
Commissioner of Patents